United States Patent [19]

Maeda et al.

[11] Patent Number: 4,854,519
[45] Date of Patent: Aug. 8, 1989

[54] MAGAZINE FOR CONTAINING STRIP OF RECORDING MEDIUM

[75] Inventors: Yutaka Maeda, Isehara; Hiroyuki Makiyama, Tokyo, both of Japan

[73] Assignee: Minolta Camera Kabushiki Kaisha, Osaka, Japan

[21] Appl. No.: 86,943

[22] Filed: Aug. 18, 1987

[30] Foreign Application Priority Data

Aug. 22, 1986 [JP] Japan .................... 61-197877

[51] Int. Cl.⁴ .................... G03B 1/04; B65D 85/66
[52] U.S. Cl. .................... 242/71.1; 206/404; 354/275
[58] Field of Search .................... 242/71, 71.1, 71.7, 242/55-53, 197, 68.5; 206/53, 409, 397; 354/275, 277; 352/72, 78 R

[56] References Cited
U.S. PATENT DOCUMENTS 3,831,881 8/1974 Tucker .................... 242/71.1 X
4,034,929 7/1977 Ebner, Jr. .................... 242/55.53 X
4,482,232 11/1984 Engelsmann et al. ......... 242/71.1 X Primary Examiner—David Werner
Attorney, Agent, or Firm—Wenderoth, Lind & Ponack

[57] ABSTRACT

A magazine includes a case for accommodating a strip of recording medium as wound around a tubular core, a support shaft provided in the case and supporting the inner periphery of the core for rendering the medium rotatable, and reverse rotation preventing members permitting forward rotation of the core when the recording medium is paid off from the case and preventing the core from rotating in a winding direction opposite to the forward rotation. Even when the recording medium is subjected at its leading end to an external pushing-in force or tends to be rotated by shaking or vibration during handling, the reverse rotation preventing members restrain the medium for rotating in the opposite direction to prevent the leading end from slipping into the case.

7 Claims, 8 Drawing Sheets

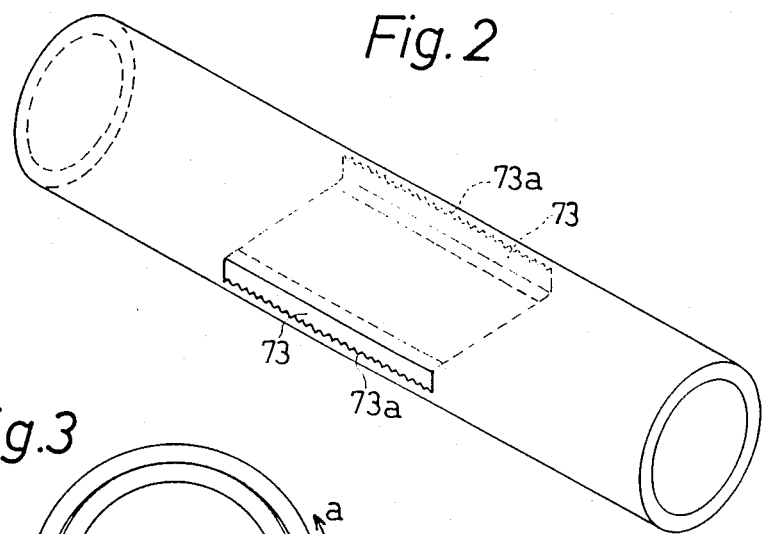
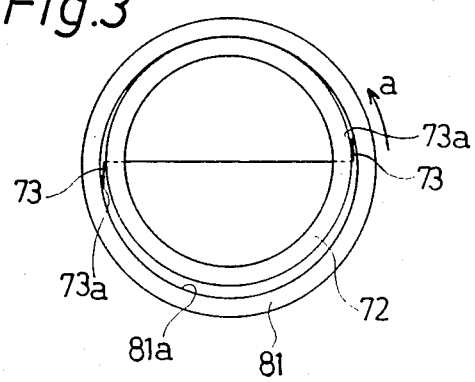

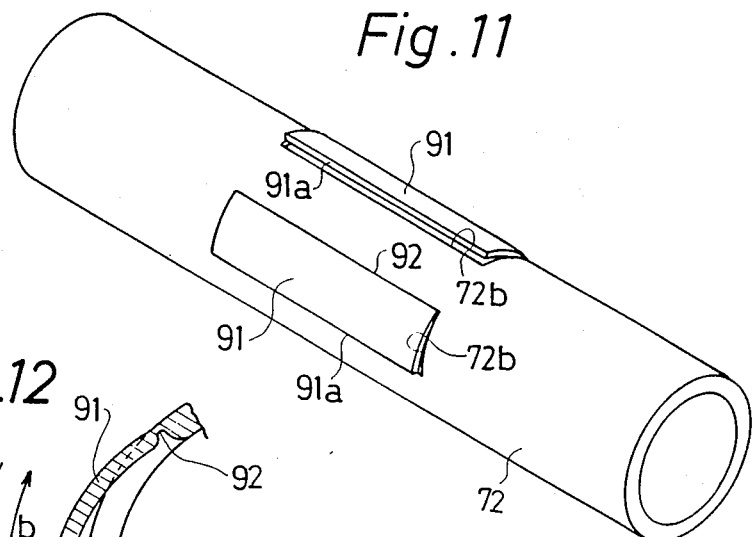
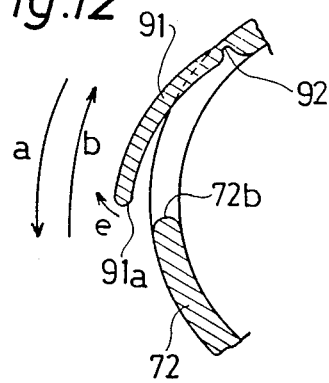

MAGAZINE FOR CONTAINING STRIP OF RECORDING MEDIUM

BACKGROUND OF THE INVENTION

The present invention relates to a magazine for containing a strip of recording medium as wound around a tubular core. The magazine is used, for example, in image recording apparatus such as laser printers for containing a silver salt film or silver salt printing paper to feed the film or paper to the exposure station of the apparatus and form images thereon.

Conventional magazines of this type include disposable ones which are made of corrugated board and in which a strip of printing paper is accommodated in the form of a roll rotatably supported in the magazine so as to be paid off from the magazine.

However, when the leader portion of the paper extending outward from the magazine is brought into engagement with or frictional contact with one's hand or an external article and is thereby subjected to a force tending to push the leader portion into the magazine while the magazine is being handled, for example, for loading, the roll of paper is likely to rotate in the paper winding direction causing the leader portion to retract into the magazine. When shaken or vibrated, the magazine is also likely to permit the roll to similarly rotate in the winding direction. The remaining portion of the paper then can not be withdrawn from the magazine again and is therefore discarded as waste.

Accordingly, it is conventional practice to fix the outwardly extending leader portion to the outer surface of the magazine with an adhesive tape to thereby prevent the leader portion from slipping into the magazine.

Nevertheless, since the magazine is handled during loading after the adhesive tape is removed from the magazine, the leader portion of the printing paper is still likely to slip into the magazine during handling or loading. The magazine must therefore be handled and loaded with utmost care to avoid such an incident. Precaution must also be taken when the magazine is unloaded during use since the paper is not fixed with any adhesive tape.

SUMMARY OF THE INVENTION

The main object of the present invention is to provide a magazine for containing a roll of recording medium that is prevented from rotating in the winding direction so as to obviate the likelihood that the leading end of the medium will slip into the magazine during handling.

Another object of the invention is to provide a magazine for containing a roll of recording medium that is prevented from rotating in the winding direction by a simple member provided on a support shaft for rotatably supporting the recording medium.

Another object of the invention is to provide a magazine which is adapted to contain a roll of recording medium that is satisfactorily prevented from rotating in the winding direction and which nevertheless assures free rotation of the recording medium in the unwinding direction so that the medium can be paid off smoothly for use.

Another object of the invention is to provide a magazine for containing a strip of recording medium, with the leading end of the medium positioned with a high degree of stability and rendered less likely to be subjected to an external force, the magazine thus being made easy to handle and usable with a reduced likelihood of trouble.

Other objects and features of the invention will become apparent from the following description with reference to the accompanying drawings.

BRIEF DESCRIPTION OF THE DRAWINGS

FIG. 2 is a perspective view showing a support shaft for the magazine of FIG. 1;

FIG. 3 is a cross-sectional view showing the support shaft of FIG. 2 as associated with a tubular core for a strip of photosensitive material accommodated in the magazine of FIG. 1;

FIG. 11 is a perspective view showing a second embodiment of a support shaft of the magazine of the invention; and FIG. 12 is an enlarged fragmentary view in cross section showing the support shaft of FIG. 11.

DETAILED DESCRIPTION OF THE PREFERRED EMBODIMENTS

Embodiments of the present invention will be described below with reference to the drawings.

Figure 4:
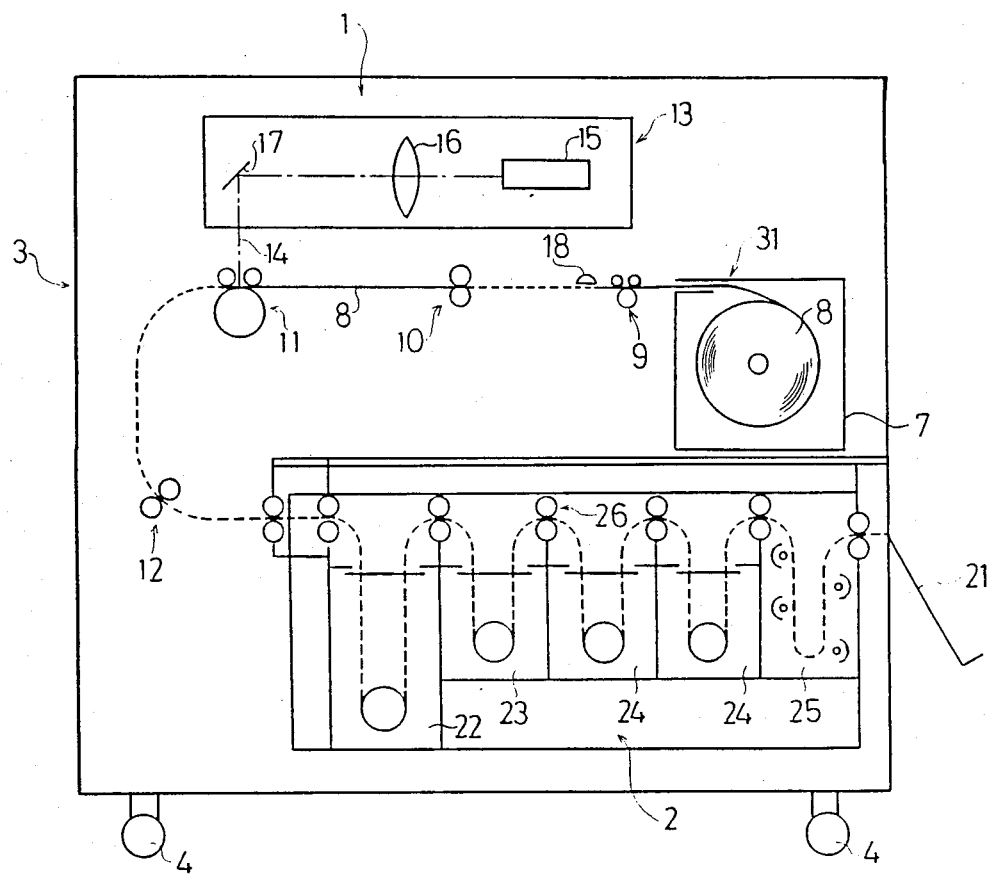
FIG. 4 is a side elevation view schematically showing the interior structure of a laser printer for use with the magazine of FIG. 1.

The magazine embodying the invention for containing a strip of recording medium is used as a supply magazine, for example, in a laser image recording apparatus. FIG. 4 schematically shows the construction of such an apparatus.

The apparatus has a laser image forming unit 1 and an automatic developing unit 2 in its main body 3.

The laser image forming unit 1 is provided with a supply magazine 7 loaded in the main body 3 for paying off a strip of silver salt film, silver salt printing paper or like photosensitive material 8. The unit 1 comprises an optical head 13 for projecting a laser beam 14 on the material 8 to form an image thereon while the material 8 is being transported longitudinally thereof by transport rollers 9, 10, 11 and 12. During the image formation, the photosensitive material 8 is sent forward by the transport rollers 11 in a subscanning direction with high precision.

In accordance with an image signal given, a laser light source 15 emits the laser beam 14, which is repeatedly reflected and swept in the main scanning direction by unillustrated scanning means and is projected onto the material through a lens 16 and reflecting mirror 17. Thus, the laser beam 14 scans the material 8 in the main scanning direction while the material is being transported in the subscanning direction perpendicular to the main direction, whereby the material is exposed to the laser beam 14 from portion to portion thereof to facilitate the formation of the image.

A cutter 18 for cutting the photosensitive material 8 is disposed immediately adjacent to the transport rollers 9 and downstream therefrom with respect to the direction of transport. The cutter 18 is operated in response to the depression of an image forming button by the operator in accordance with the desired size of the photosensitive sheet set by the operator. More specifically, the transport rollers 9 draw out the material 8 from the supply magazine 7 by a length corresponding to the specified size upon the depression of the button, whereupon the cutter 18 operates to cut the material 8. Thus, the cut-off portion of the material has the specified length and is subsequently transported and exposed.

The automatic developing unit 2 receives the exposed material 8, automatically develops the image thereon to a visible image and thereafter discharges the material 8 from the main body 3 onto a tray 21. The developing unit 2 has a color developing chamber 22, a bleaching-fixing chamber 23, rinsing chambers 24 using, for example, water, and a drying chamber 25, etc. The photosensitive material 8 is passed through the series of chambers and is thereby developed. For this purpose, the unit 2 is internally provided with suitable transport means 26.

As seen in FIGS. 1 to 3 and FIGS. 5 to 8, the supply magazine 7 is type disposable type, has a rectangular parallelepipedal case 71 made of corrugated board and is removably mounted in a loading assembly 31 disposed in the laser image forming unit 1 of the main body 3.

The case 71 is internally provided with a tubular support shaft 72 centrally thereof. The shaft 72 is fixed at its opposite ends to the end walls of the case 71. The photosensitive material 8 accommodated in the case 71 is wound around a tubular core 81, which is fitted around the support shaft 72. Thus, the inner periphery 81a of the tubular core 81 is supported on the shaft 72.

The core 81 has an inside diameter slightly larger than the outside diameter of the support shaft 72. While a small clearance is formed between the inner periphery 81a of the core 81 and the outer periphery of the support shaft 72, the inner peripheral surface 81a is in contact with winding rotation preventing members 73 provided on the outer periphery of the shaft 72. As seen in FIGS. 2 and 3, each winding rotation preventing member 73 projects in the same direction as the direction a in which the photosensitive material 8 is unwound, extend from a respective one of two portions of the outer peripheral surface of the support shaft 72, and has, at its forward end, serrations 73a in contact with the inner periphery 81a of the tubular core 81. When the core 81 is rotated in the direction a to pay off the material 8, the rotation preventing members 73 slide on the inner periphery 81a of the core 81 without impeding the rotation in the unwinding direction, but when the core 81 is rotated in the other direction b which would tend to wind the material 8 therearound, the serrations 73a of the preventing members 73 engage in the inner periphery 81a of the core 81, preventing the core 81 from rotating in the winding direction b. While the members 73 are provided by bending the opposite ends of a plate diametrically extending through the support shaft 72, the members 73 can be provided by other various means and can have various other shapes.

Although the tubular core 81 and the rotation preventing members 73 are not limited to comprising specific in material, it is suitable to prepare the core 81 from a paper tube, and the members 73 from a metal such as stainless steel.

With reference to FIG. 1 and FIGS. 5 to 8, the case 71 is provided at its upper portion with an opening 76 which is formed by lapping an upper closure 71b having light blocking members 75 on its lower surface over a lower closure 71a having light blocking members 75 on its upper surface. Through the opening 76, the photosensitive material 8 within the supply magazine 7 is paid off. The upper closure 71b is formed in the vicinity of the opening 76 with two apertures 77 extending widthwise of the material 8 for allowing the dispenser rollers 39 to contact the material and subsequently pay off a predetermined length of the material 8. The upper closure 71b includes along its front end a transparent member 78 defining the front or outer side of each aperture 77. Whether the photosensitive material 8 is present beneath the transparent member 78 can be checked from outside the case through the member 78.

Figure 1:
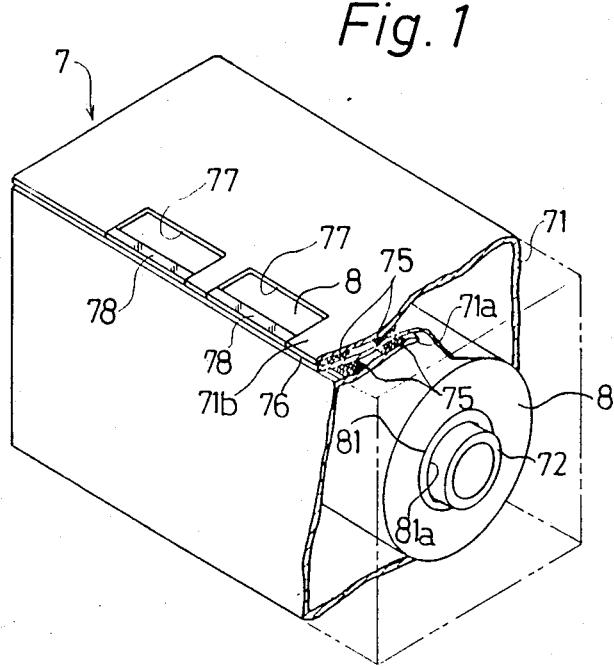
FIG. 1 is a perspective view showing a magazine of a first embodiment of the invention, the case of the magazine being partly broken away.
Figure 6:
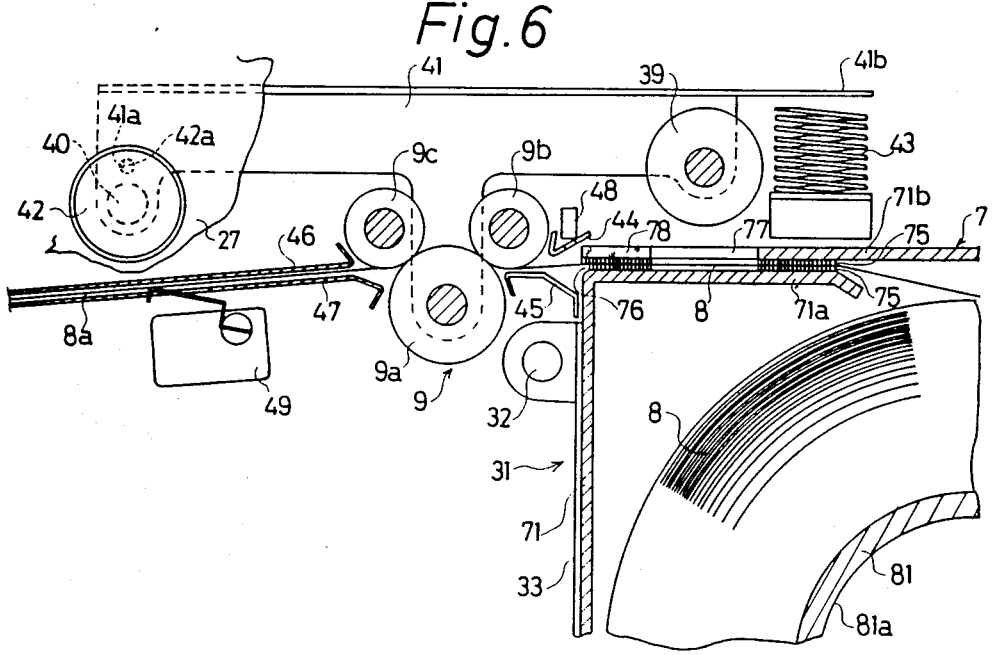
FIGS. 6 to 8 are enlarged fragmentary side elevation views showing the magazine loading assembly of FIG. 5 in different operative states.

When normally positioned, the material 8 in the magazine 7 extends to the position beneath the transparent members 78 although not projecting from the opening 76 as seen in FIGS. 1 and 6.

This precludes the leading end of the material 8 accommodated in the magazine 7 from being engaged by, or coming into contact with, some other article outside the magazine, consequently diminishing the likelihood that the end will be forced into the magazine 7. Should the leading end of the material 8 be forced inward by the engagement or contact with such an article if extending through the opening 77, the effectiveness of the force will be limited by the narrow slitlike opening 76 and will not be substantially exerted on the leading end. Since the material 8 within the case 71 is prevented from rotating in the winding direction b as described above, and thus the retraction of the leading end under its own stiffness is resisted, the leading end is prevented from slipping into the case 71. When the magazine 7 is shaken or vibrated during handling, for example, during loading, the photosensitive material 8 therein may be rotated in the unwinding direction but will not be rotated in the winding direction. It is therefore unlikely that the leading end will slip into the case 71.

Whereas the leading end of the photosensitive material as pulled out from the magazine is conventionally affixed to the outer surface of the magazine with an adhesive tape, the construction of the magazine 7 obviates the need of this procedure. Even if the leading end of the material 8 extends outward from the magazine 7 and is liable to be subjected to an external force, the leading end is precluded from retracting into the case 71.

The loading assembly 31 includes a magazine holder 33 which is L-shaped and rotatably supported by a pivot 32 on side plates of the main body 3 (one of which is illustrated at 27). The magazine is removably retained on the holder 33. The bottom plate of the holder 33 has an outer end 33a bearing on a coiled spring 35 disposed on a base 34. The outer end 33a is shiftable according to the quantity of the material 8 remaining in the magazine 7 on the holder 33. The shift is detectable by a light blocking member 50 fixed to the outer end 33a and a photocoupler 36 fixed independently of the member 50 to detect the remaining quantity of the material 8.

Restraining pins 37 and 38 positioned above and below the outer end 33a are attached to the side plates of the main body 3. The contact of the outer end 33a with these pins 37, 38 limits the range of movement of the magazine holder 33 about the pivot 32.

Figure 8:
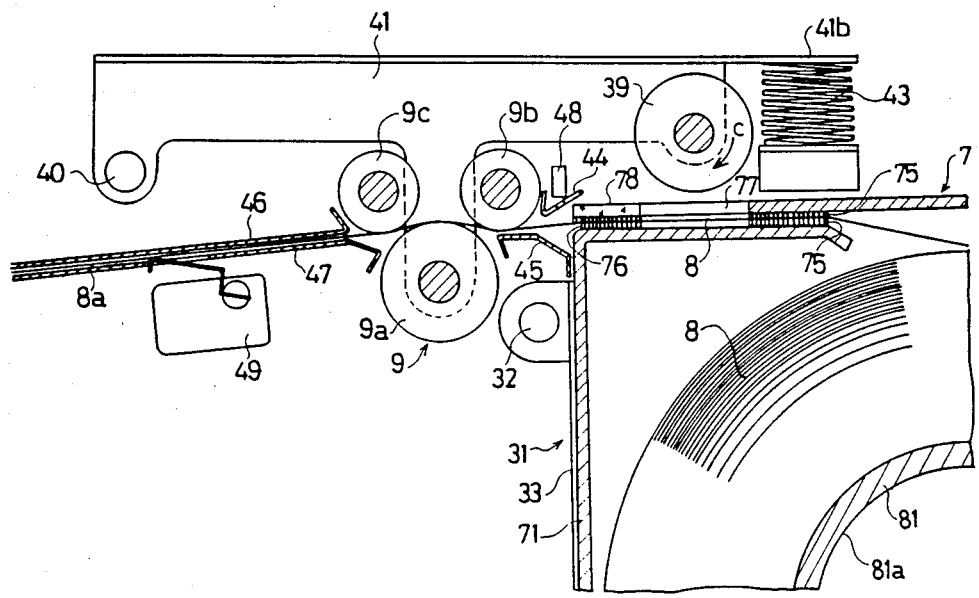

The dispenser rollers 39 positioned opposite the apertures 77 in the magazine 7 on the holder 33 feed out the material 8 from the magazine 7 to the transport rollers 9, which include a feed roller 9a drivingly rotatable in a counterclockwise direction as indicated by arrow d in FIG. 8, and uncurling rollers 9b, 9c driven by the roller 9a under the contact therewith.

Figure 5:
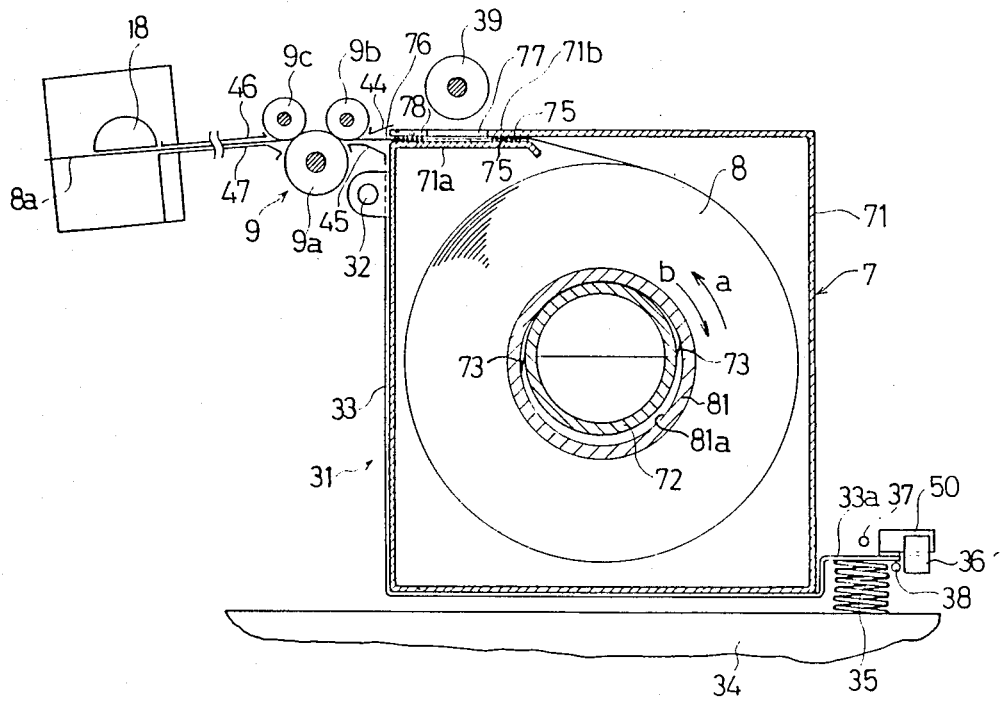
FIG. 5 is a side elevation view showing a magazine loading assembly included in the laser printer of FIG. 4.
Figure 7:
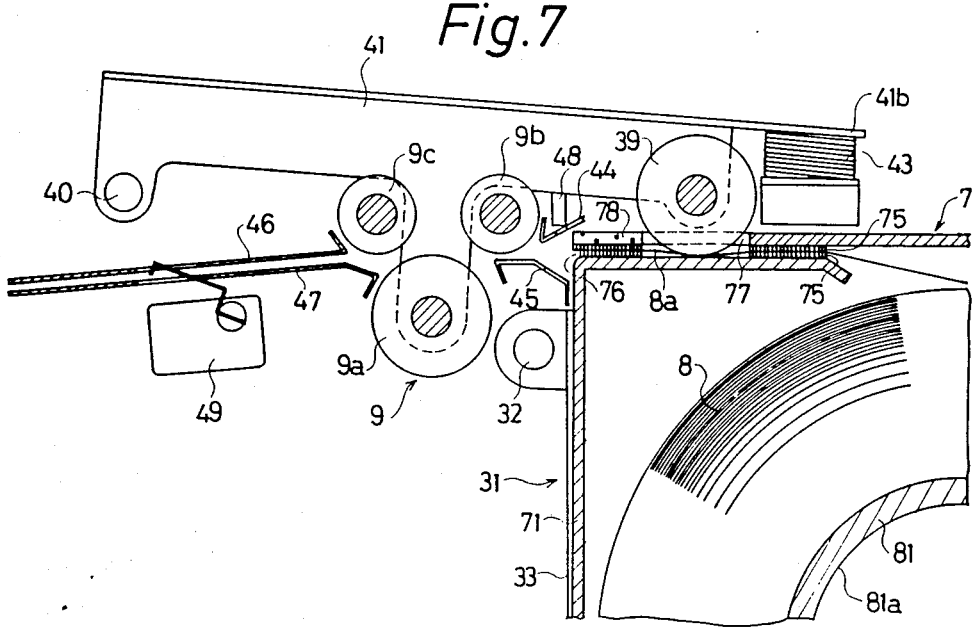

While the uncurling rollers 9b, 9c are supported by shafts directly mounted on the side plates of the main body 3, the dispenser rollers 39 and the feed roller 9a are supported by shafts on a lever 41 which is supported at its one end by a pivot 40 fixed to the side plates of the main body 3. Accordingly, the lever 41, when pivotally moved upward, retracts the dispenser rollers 39 to a position located above the apertures 77 of the magazine, while bringing the feed roller 9a into pressing contact with the uncurling rollers 9b, 9c as shown in FIGS. 5 and 6. Further downward movement of the lever 41 causes the dispenser rollers 39 to extend into the apertures 77 of the magazine 7 from above, bringing the rollers 39 into pressing contact with the leading end of the material 8 lying on the lower closure 71a of the case 71, while moving the feed roller 9a away from the uncurling rollers 9b, 9c as seen in FIG. 7.

A rotary solenoid 42 is used for moving the lever 41 upwardly or downwardly (FIG. 6). The solenoid 42 is fixed to one side plate 27 of the main body 3 in alignment with the axis of the pivot 40 for the lever 41 and has an operating pin 42a engaged in a hole 41a formed in the lever 41 in the vicinity of the pivot 40. Consequently, the solenoid 42, when rotated in the counterclockwise direction as shown, moves the lever 41 upwardly to the position shown in FIGS. 5 and 6, while when it is rotated in a clockwise direction, the lever 41 is moved downward to the position shown in FIG. 7.

When deenergized, the rotary solenoid 42 renders the lever 41 free to move, whereupon the forward end 41b of the lever 41 rests on a coiled spring 43 fixed to the unillustrated side plate as seen in FIG. 8. Accordingly, the lever 41 is disposed at a horizontal position, supporting the dispenser rollers 39 in a slightly raised position above the apertures 77 and retaining the feed roller 9a in a neutral position a small distance away from the uncurling rollers 9b, 9c.

Guide plates 44, 45 are arranged between the transport rollers 9 and the opening 76 of the magazine 7 on the holder 31, and, guide plates 46, 47 are arranged between the transport rollers 9 and the cutter 18. The path defined by the guide plates 44, 45 is associated with an ultrasonic sensor 48, while the path provided by the guide plates 46, 47 is associated with a microswitch 49. The sensor 48 and the switch 49 detect the photosensitive material 8 as transported to respective locations.

The operation for paying off the photosensitive material 8 from the magazine 7 will be described below.

When the magazine 7 is fitted into the loading assembly 31, the lever 41 is in the neutral position as shown in FIG. 8 with the rotary solenoid 42 in an off state. When the material 8 is to be paid off from the loaded magazine 7, the rotary solenoid is first energized to revolve the pin 42a in a clockwise direction and move the lever 41 downward against the spring 43. At the same time, the dispensing rollers 39 and the feed roller 9a are driven in the directions of arrows c and d, respectively, by unillustrated drive means. Consequently, the dispenser rollers 39, while rotating, advance into the apertures 77 and pay off the leading end of the material 8 in contact therewith, while the feed roller 9a moves a significant distance away from the uncurling rollers 9b, 9c while rotating, permitting the paid-off material leading end to smoothly advance into the space between the roller 9a and the rollers 9b, 9c as shown in FIG. 7.

The paid-off leading end passes between the guide plates 44, 45 and the transport rollers 9 and advances into the path defined between the guide plates 46, 47, actuating the switch 49, which in turn rotates the solenoid 42 in the counterclockwise direction to pivotally move the lever 41 upward. This retracts the dispenser rollers 39 upward from the apertures 77 and away from the material 8, while the feed roller 9a is pressed against the uncurling rollers 9b, 9c from below, with the material 8 nipped between the roller 9a and the rollers 9b, 9c as shown in FIGS. 5 and 6. The material 8 is thereafter passed over the feed roller 9a between the uncurling rollers 9b, 9c while being bent in a direction opposite to the curl produced by winding and is sent forward by the roller 9a. Thus, the material 8 is transported toward the cutter 18 while being uncurled.

A specified length of the material 8, when forwarded, is cut off by the cutter 18, and the cut-off sheet is thereafter processed by the image forming unit 1 and the automatic developing unit 2 in succession.

When the cutter 18 operates, the rotary solenoid 42 is deenergized, and the rotation of the dispenser rollers 39 and of the feed roller 9a ceases, whereby the rollers are returned to the neutral position shown in FIG. 8 and held in this position until the material 8 is subsequently paid off.

When the magazine 7 is to be unloaded, an unillustrated unloading switch is manipulated, whereby the solenoid 42 is energized for clockwise rotation, moving the lever 41 downward. At the same time, the dispenser rollers 39 and the feed roller 9a are driven in a direction opposite to the paying-off direction by the unillustrated drive means. Consequently, the dispenser rollers 39 rotating in the opposite direction advance into the apertures 77 and come into pressing contact with the material 8, whereby the paid-off end portion of the material 8 extending from the magazine to a location adjacent the cutter 18 is pushed into the case 71 of the magazine 7 since the feed roller 9a is away from the uncurling rollers 9b, 9c while rotating in a direction opposite to its paying-off direction.

Although the tubular core 8 is restrained at this time from rotating in the winding direction (i.e. in the direction of arrow b in FIG. 5) as already stated, the dispenser rollers 39 force the paid-off end portion of the material 8 into the supply magazine 7, with the result that the material 8 wound around the core 8 is subjected to a pushing-in force, which overcomes the stiffness of the material 8, causing the paid-off end portion to retract into the magazine while slackening.

When the magazine 7 restores its normal state with the leading end of the material 8 retracted to a location beneath the transparent members 78 adjacent the apertures 76, the sensor 48 ceases to detect the photosensitive material 8, thereby deenergizing the rotary solenoid 42 and allowing the dispenser rollers 39 and the feed roller 9a to return to the neutral position of FIG. 8, with the rotation of these rollers ceased. The magazine 7 is now unloadable.

Figure 10:
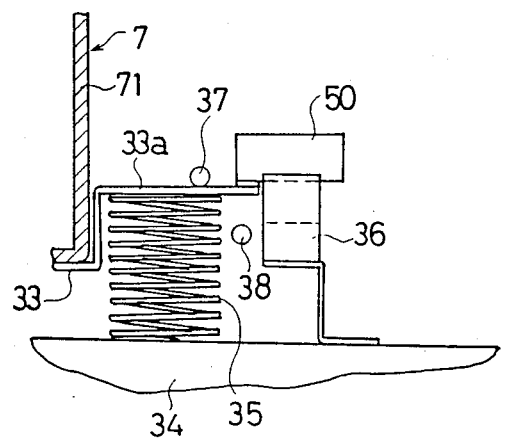
FIGS. 9 and 10 are enlarged side elevation views showing different operative positions of means included in the loading assembly for detecting the remaining quantity of the strip.
Figure 9:
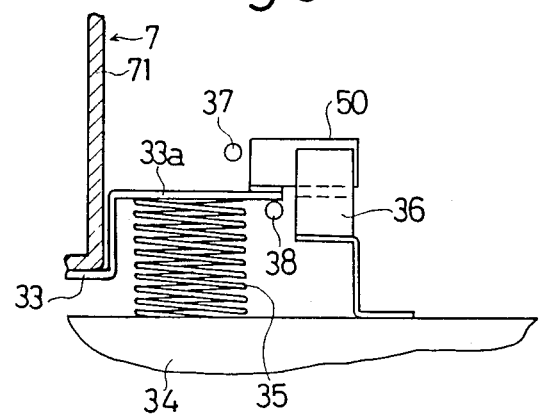

While a sufficient quantiy of rolled-up photosensitive material 8 remains in the magazine 7, the magazine 7 compresses the coiled spring 35 causing the light blocking member 50 to block the light across the photocoupler as seen in FIGS. 5 and 9. However, when the material 8 is diminished to a predetermined amount, the force of the coiled spring 35 overcomes the weight of the magazine 7, consequently raising the magazine holder 33 and shifting the light blocking member 50 off the photocoupler 36 as shown in FIG. 10. This turns on the photocoupler 36, whereby the decrease in the remaining quantity can be detected. The "on" signal turns on an unillustrated display to inform the operator of the lack of the material 8.

The remaining quantity detecting means for the magazine 7 may also be used in connection with a rack formed in a portion of the main body 3 for supporting stock for such a magazine 7 thereon. The detecting means then indicates the remaining quantity in stock. This is convenient both before and after the magazine is used. When magazines having different sizes are to be stocked, it is desirable to provide a rack and detecting means specifically for each size since magazines having different sizes have different weights.

FIGS. 11 and 12 show a second embodiment of the support shaft 72 which is made of synthetic resin and integrally formed with four winding rotation preventing members 91 on its outer periphery. The members 91 are arranged circumferentially of the shaft 72 and are in the form of skived fins. Each of the rotation preventing members 91 is joined to a window portion 72b of the shaft 72 by an elastic hinge portion 92 having a smaller thickness than the fin and has an outer end 91a projecting from the outer peripheral surface of the support shaft 72 by a suitable amount.

The outer end 91a of the preventing member 91 is so shaped as to be less likely to engage the tubular core 81 than the foregoing rotation preventing member 73. When a roll of photosensitive material rotates in a direction a for paying off the material 8, each rotation preventing member 91 is forced in a direction opposite to the direction of arrow e in FIG. 12, smoothly sliding on the inner periphery of the tubular core without impeding the paying-off rotation, whereas when the roll of photosensitive material tends to rotate in a direction b, i.e. in the winding direction, the preventing member 91 moves outwardly of the shaft 72 in the direction of arrow e to create increased friction with the tubular core, thereby preventing the roll from rotating in the winding direction. This preventing action is greater when the preventing member 91 has a smaller width and projects outward at a large angle with respect to the outer surface of the support shaft 72.

The support shaft 72 in each of the above embodiments is a single tube extending through the core 81 and fixed at its opposite ends to the case 71. The shaft 72 is desirable since it reinforces the case 71 and supports a strip of recording medium with enhanced strength. However, it is possible to use two divided shaft segments in alignment, or a cantilever support shaft in a particular case. Furthermore, winding rotation preventing members can be fixedly provided at desired portions of the support shaft, in opposed relation to desired portions of the tubular core.

What is claimed is:

1. A magazine containing a strip of recording medium as wound around a tubular core, said magazine comprising:
    a case for accommodating the recording medium therein;
    a support shaft fixedly provided in the case and supporting the inner periphery of the tubular core for rendering the recording medium rotatable,
    said case having an opening portion defined therein for placing the interior of the case in communication with the outside and through which the recording medium is paid off from the case; and
    reverse rotation preventing means associated with said support shaft for permitting rotation of the tubular core in a forward direction when the recording medium is paid off through the opening portion and for preventing the tubular core from rotating in a winding direction that is opposite to the forward direction,
    said reverse rotation preventing means including at least one projecting member which is in frictional contact with the inner periphery of the tubular core for providing resistance at the inner periphery of the core that inhibits the rotation of the tubular core in the winding direction, each said projecting member projecting from the outer periphery of the support shaft in a direction extending substantially tangential to the outer periphery of the support shaft and toward the inner periphery of the tubular core.

2. A magazine as defined in claim 1, wherein said reverse rotation prevention means includes a plate extending through the support shaft diametrically thereof, and each said projecting member extends from said plate.

3. A magazine as defined in claim 1, wherein the support shaft comprises synthetic resin, and each said projecting member is integral with the support shaft.

4. A magazine as defined in claim 1, wherein the case has a lower closure and an upper closure overlapping the lower closure, the opening portion defined therebetween, and the lap of the lower and the upper closures having at least one aperture extending therein for receiving a dispenser roller.

5. A magazine as defined in claim 4, wherein the recording medium in the case has a leading end positioned at the outer end of the opening portion of the case.

6. A magazine as defined in claim 5, and further comprising a transparent member forming an outer end portion of the upper closure and defining the outer edge of each said aperture.

7. A magazine as defined in claim 1, wherein each said projecting member is saw-shaped.

* * * * *